(12) United States Patent
Sugimoto (10) Patent No.: US 11,042,151 B2
(45) Date of Patent: Jun. 22, 2021

(54) SYSTEMS AND METHODS FOR REMOTELY ACTIVATING A VEHICLE

(71) Applicant: Toyota Motor North America, Inc., Plano, TX (US)

(72) Inventor: Shingo Sugimoto, Frisco, TX (US)

(73) Assignee: Toyota Motor North America, Inc., Plano, TX (US)

( * ) Notice: Subject to any disclaimer, the term of this patent is extended or adjusted under 35 U.S.C. 154(b) by 279 days.

(21) Appl. No.: 16/183,808

(22) Filed: Nov. 8, 2018

(65) Prior Publication Data
US 2020/0150646 A1    May 14, 2020

(51) Int. Cl.
*G05D 1/00* (2006.01)
*H04W 4/40* (2018.01)
*G06Q 20/32* (2012.01)

(52) U.S. Cl.
CPC ......... *G05D 1/0011* (2013.01); *G05D 1/0088* (2013.01); *G06Q 20/3224* (2013.01); *H04W 4/40* (2018.02)

(58) Field of Classification Search
CPC ..... G05D 1/0011; G05D 1/0088; H04W 4/40; G06Q 20/3224
See application file for complete search history.

(56) References Cited

U.S. PATENT DOCUMENTS

| | | |
|---|---|---|
| 9,682,609 B1 | 6/2017 | Dudar |
| 9,778,831 B2 | 10/2017 | Penilla et al. |
| 9,994,175 B2 | 6/2018 | Maeshiro |
| 2010/0161720 A1 | 6/2010 | Colligan et al. |
| 2012/0234930 A1 | 9/2012 | Wijaya |
| 2016/0241999 A1* | 8/2016 | Chin ................. G08C 23/04 |
| 2017/0132934 A1* | 5/2017 | Kentley ............ G08G 1/202 |
| 2017/0178035 A1 | 6/2017 | Grimm et al. |
| 2017/0197568 A1 | 7/2017 | DeCia et al. |

* cited by examiner

*Primary Examiner* — Michael D Lang
(74) *Attorney, Agent, or Firm* — Christopher G. Darrow; Darrow Mustafa PC (57) ABSTRACT

Systems and methods described herein relate to remotely activating a vehicle. One embodiment receives transaction information regarding an electronic payment; associates the transaction information with a vehicle; determines that the vehicle is within a predetermined distance from a business where the electronic payment was transacted; and transmits, to the vehicle, a remote activation command that activates one or more subsystems of the vehicle.

20 Claims, 8 Drawing Sheets

SYSTEMS AND METHODS FOR REMOTELY ACTIVATING A VEHICLE

TECHNICAL FIELD

The subject matter described herein relates in general to vehicles and, more particularly, to systems and methods for remotely activating a vehicle.

BACKGROUND

Vehicle owners or drivers often use their vehicles to visit places of business and make purchases. This frequently involves parking the vehicle some distance away from a store or other place of business. When the driver has completed a purchase and is ready to drive elsewhere, the driver must then walk back to the vehicle, sometimes in inclement weather. If the vehicle happens to be parked in a location that results in its interior becoming uncomfortably hot or cold while the driver is shopping or performing other errands, it can be unpleasant for the driver to reenter the vehicle upon returning to it.

SUMMARY

Systems and methods for remotely activating a vehicle are disclosed. One embodiment is a system for remotely activating a vehicle, comprising one or more processors and a memory communicably coupled to the one or more processors. The memory stores a payment-information module including instructions that when executed by the one or more processors cause the one or more processors to receive transaction information regarding an electronic payment and to associate the transaction information with a vehicle. The memory also stores a remote-activation module including instructions that when executed by the one or more processors cause the one or more processors to determine that the vehicle is within a predetermined distance from a business where the electronic payment was transacted and to transmit, to the vehicle, a remote-activation command that activates one or more subsystems of the vehicle.

Another embodiment is a method of remotely activating a vehicle, comprising receiving transaction information regarding an electronic payment; associating the transaction information with a vehicle; determining that the vehicle is within a predetermined distance from a business where the electronic payment was transacted; and transmitting, to the vehicle, a remote activation command that activates one or more subsystems of the vehicle.

Another embodiment is a system for remotely activating a vehicle, comprising one or more processors and a memory communicably coupled to the one or more processors. The memory stores a remote-command module including instructions that when executed by the one or more processors cause the one or more processors to receive, at the vehicle, a remote-activation command prompted by an electronic payment transacted by a person associated with the vehicle and, in response to the remote-activation command, to activate at least one of an engine and a heating, ventilation, and air-conditioning (HVAC) subsystem of the vehicle.

Another embodiment is a method of remotely activating a vehicle, comprising receiving, at the vehicle, a remote-activation command prompted by an electronic payment transacted by a person associated with the vehicle and, in response to the remote-activation command, activating at least one of an engine and a heating, ventilation, and air-conditioning (HVAC) subsystem of the vehicle.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

In various embodiments described herein, an electronic payment made by a vehicle owner or driver (hereinafter, "driver," "user," or "passenger") triggers automatic activation of one or more subsystems of the vehicle. Those subsystems can include, without limitation, the vehicle's engine and the vehicle's heating, ventilation, and air-conditioning (HVAC) subsystem. This makes it possible for a driver to reenter a comfortable vehicle after completing a visit to a store, restaurant, or other business. In some embodiments, the vehicle can, in addition, autonomously drive itself to the user's location (e.g., in front of a store) to pick up the user and/or other passengers. The specific circumstances in which the automatic activation of vehicle subsystems and remote valet service are carried out can be customized in accordance with a set of flexible user preferences.

In one embodiment, a remote-features server receives, from a payment gateway, transaction information regarding the user's electronic payment and associates the transaction information with the user's vehicle. The remote-features server then determines whether the vehicle is within a predetermined distance from the business where the electronic payment was transacted. If so, the remote-features server transmits, to the vehicle, a remote-activation command that activates one or more vehicle subsystems, as explained above. Optionally, the remote-features server can automatically send a remote-valet command directing the vehicle to pick up the user, or the user may send a remote-valet command using a mobile device (e.g., a smartphone) to request pickup.

Figure 3:
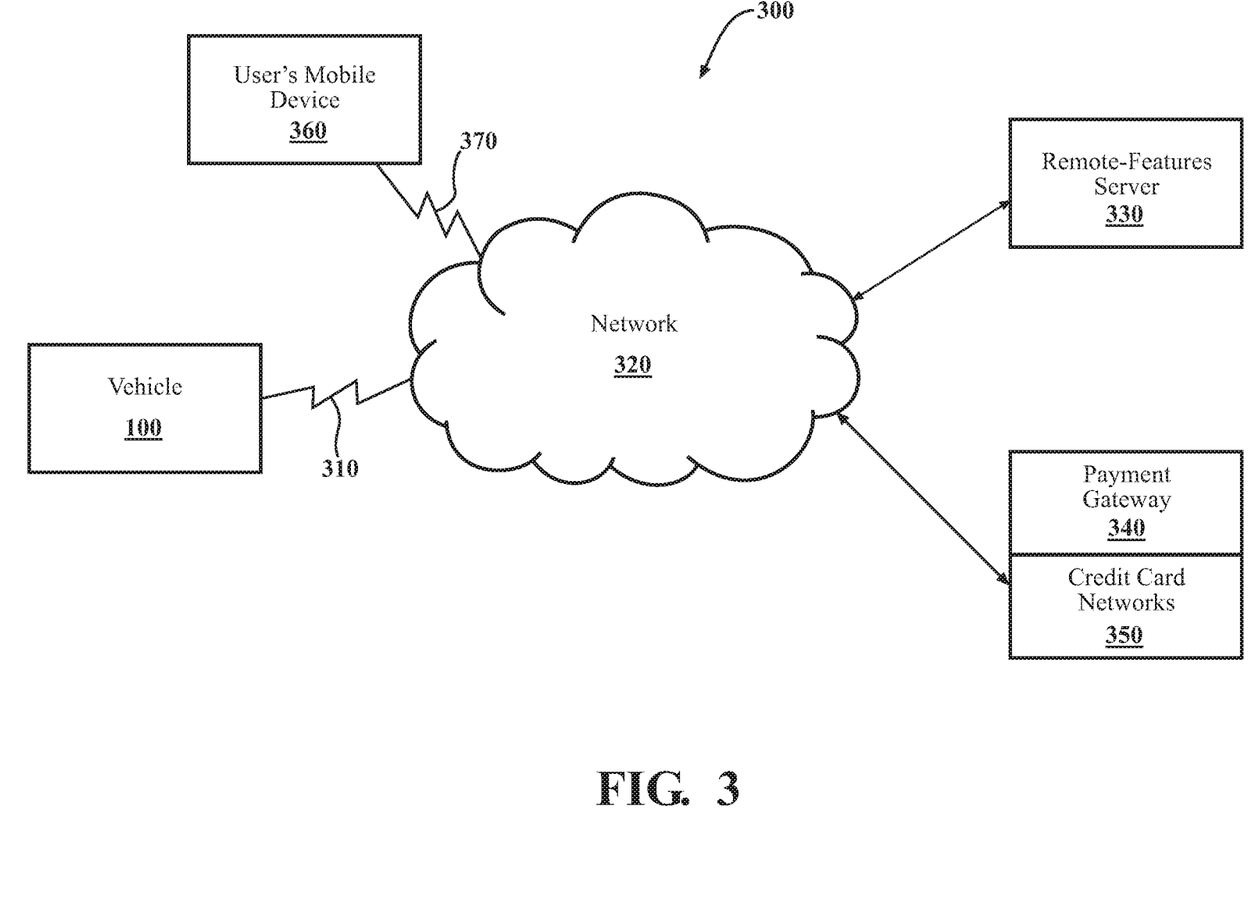
FIG. 3 illustrates one embodiment of a network architecture in which systems and methods disclosed herein may be implemented.

FIG. 3 illustrates one embodiment of a network architecture 300 in which systems and methods disclosed herein may be implemented. In FIG. 3, remote-features server 330 communicates via network 320 with payment gateway 340 and credit card networks (or other electronic payment systems such as Apple Pay, PayPal, Square, Stripe, etc.) 350. Remote-features server 330 also communicates with vehicle 100 and user's mobile device 360. User's mobile device 360 can also communicate with vehicle 100 via network 320. Vehicle 100 and user's mobile device 360 connect with network 320 via wireless links 310 and 370, respectively. Wireless links 310 and 370 can be, for example, cellular connections (e.g., 3G, 4G LTE, 5G, etc.). Network 320 may include the Internet, depending on the embodiment. For security, some or all of the communication links shown in FIG. 3 may be encrypted.

In some embodiments, remote-features server 330 is owned and operated by an automobile manufacturer. In other embodiments, remote-features server 330 is owned and operated by a service provider under contract with an automobile manufacturer. A user desiring the kinds of remote-activation services described herein, in some embodiments, pays a subscription fee to the automobile manufacturer or other service provider. In connection with that subscription, the user (vehicle owner or driver) can choose to authorize credit card companies or other electronic-payment entities to securely send transaction information automatically to remote-features server 330 whenever the user makes an electronic payment.

Figure 4:
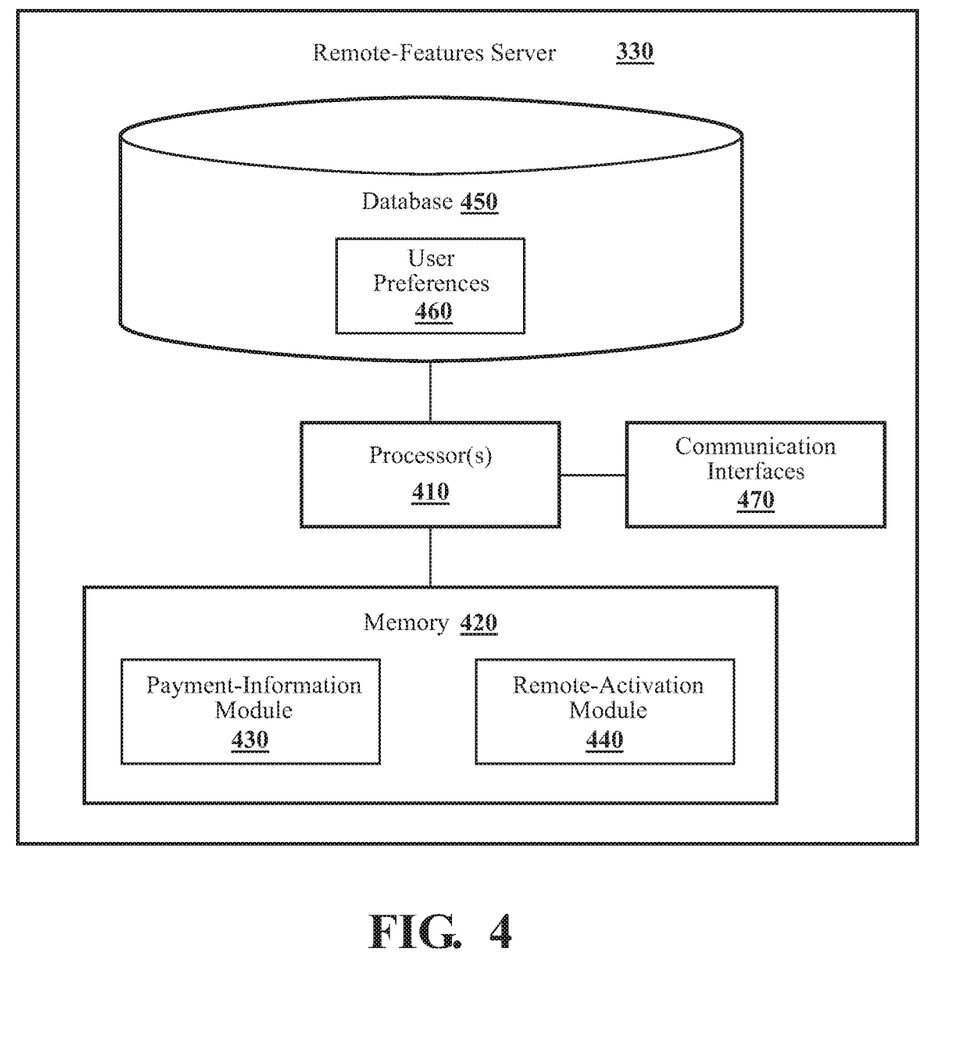
FIG. 4 illustrates one embodiment of a remote-features server.

FIG. 4 illustrates one embodiment of a remote-features server 330. Remote-features server 330 includes one or more processors 410. The one or more processors 410 are communicably coupled to a memory 420 that stores payment-information module 430 and remote-activation module 440. The memory 420 is a random-access memory (RAM), read-only memory (ROM), a hard-disk drive, a flash memory, or other suitable memory for storing the modules 430 and 440. The modules 430 and 440 are, for example, computer-readable instructions that when executed by the one or more processors 410, cause the one or more processors 410 to perform the various functions disclosed herein. Remote-features server 330 communicates, via communication interfaces 470 and network 320, with other nodes shown in FIG. 3. Communication interfaces 470 support network communication protocols such as Transmission Control Protocol/Internet Protocol (TCP/IP). As explained further below, user preferences 460 can be stored in database 450.

Payment-information module 430 generally includes instructions that cause the one or more processors 410 to receive transaction information regarding electronic payments made by users who have opted into the remote-activation services described herein. Such transaction information can include the date and time of the transaction, the business or entity to which the payment was made, the transaction amount, and identification of the instrument used for payment (e.g., a credit card number or account number). Based on this transaction information (particularly the identification of the instrument/account used for payment), payment-information module 430 associates the transaction information with a specific vehicle. Payment-information module 430 then passes control to remote-activation module 440.

Remote-activation module 440 generally includes instructions that cause the one or more processors 410 to send remote-activation commands to vehicles 100 under certain circumstances. More specifically, remote-activation module 440 determines whether the particular vehicle 100 with which payment-information module 430 associated the transaction information is currently within a predetermined distance from the business where the electronic payment was transacted. Remote-activation module 440 can do this by, for example, looking up the location of the business where the electronic payment was transacted (e.g., GPS coordinates) and computing the distance to the current location of vehicle 100, as reported to remote-features server 330 via network 320.

The predetermined distance varies, depending on the embodiment, and can be configured by the user as a preference, in some embodiments. Some users who typically park close to the businesses they frequent might prefer to set the predetermined distance relatively short (e.g., 200 meters). Other users who often have to park at an underground garage and walk significant distances to the businesses they frequent might prefer a longer threshold distance (e.g., 0.5 miles).

If remote-activation module 440 determines that the vehicle 100 is within the predetermined distance from the business, remote-activation module 440 transmits, to vehicle 100, a remote-activation command that activates one or more subsystems of vehicle 100. Depending on the embodiment, those subsystems may include, without limitation, the vehicle's engine and the vehicle's HVAC subsystem.

In some embodiments, vehicle 100 is an internal-combustion-engine automobile or a hybrid vehicle that includes an internal-combustion engine. In those embodiments, the remote-activation command from remote-features server 330 may cause control circuitry in vehicle 100 (discussed below) to start the engine. Starting the engine can be for different purposes, depending on the situation and the particular embodiment. For example, activation of the HVAC subsystem in an internal-combustion-engine vehicle usually requires that the engine be running. Therefore, if a user has configured his or her user preferences 460 to activate the HVAC subsystem only (no remote-valet service), the vehicle's engine may be started in response to a remote-activation command triggered by a nearby electronic payment. If the vehicle 100 is summoned to pick up a user via a remote-valet command, the engine, of course, must first be started, whether or not the HVAC system has been activated or adjusted.

In other embodiments, vehicle 100 is an electric vehicle or a hybrid vehicle that includes an electric propulsion mode and is equipped with a heat pump. The HVAC subsystem of an electric vehicle (or of a hybrid vehicle like the one just described) can be activated without the vehicle otherwise being in operation, since it does not rely on an internal combustion engine to generate heat or operate an air conditioner. In short, an electric vehicle does not need to be "started" (its engine started) through an ignition process like an internal-combustion-engine vehicle. Additional details regarding vehicle 100 are discussed below in connection with FIGS. 1 and 2.

In some embodiments, the transmission of a remote-activation command by remote-activation module 440 is conditioned on one or more user preferences 460. Those preferences can be of a variety of different kinds. In one embodiment, a user may specify that the remote-activation command is to be sent to vehicle 100 based on his or her location. This controls more precisely the timing of the remote-activation command. For example, the user may desire that the remote-activation command be sent after he or she has left the business where the electronic payment was transacted and he or she has walked at least a minimum distance away from the business (e.g., to a curb out front).

In another embodiment, a user may choose to condition the sending of a remote-activation command on the location of vehicle 100. For example, if vehicle 100 is parked in covered parking (e.g., a parking garage), the passenger compartment might remain reasonably comfortable on a hot day, so there would be no need to activate the air conditioning remotely before the user reenters the vehicle. On the other hand, if vehicle 100 is parked in an open-air ground-level parking lot on a hot, sunny day, the passenger compartment could become quite uncomfortable, and the user might prefer that the air conditioning be activated for a period of time before the user reenters the vehicle. In the embodiment just mentioned, the user can specify that a remote-activation command is to be sent to vehicle 100 when vehicle 100 is parked in an open-air ground-level parking lot but not when it is parked in a covered parking garage. Remote-activation module 440 can determine in what kind of parking vehicle 100 is parked by, for example, looking up the vehicle's current reported location and consulting map and parking-lot/garage data available via the Internet.

In another embodiment, a user may choose to condition the sending of a remote-activation command on current weather conditions (e.g., outside weather conditions obtained from the Internet or the actual measured temperature of the vehicle's passenger compartment). In this embodiment, the user can specify under what conditions (temperature, humidity, etc.) a remote-activation command to activate the HVAC system should be sent.

In still other embodiments, a user can condition the sending of a remote-activation command on other factors such as the identity of the particular business where an electronic payment is transacted, the time of day (e.g., nighttime vs. daylight), or the user's calendar of scheduled activities. For example, regarding the user's calendar, a user may not be finished shopping or doing errands when a particular electronic payment occurs. In such a case, remote-activation module 440 can consult the user's calendar to discover that the user has another appointment or activity scheduled at the user's current location (e.g., a shopping mall or office building), so remote-activation module 440 does not transmit a remote-activation command to vehicle 100.

In another embodiment, remote-activation module 440 infers some or all of user preferences 460 based on the user's past choices in particular situations. For example, remote-activation module 440 may note that the user consistently cancels an attempted remote-activation command when the user makes a payment at a particular business. To cite another example, remote-activation module 440 may note that the user consistently accepts a remote-activation command when the interior temperature of vehicle 100 is above or below a threshold temperature. This embodiment thus incorporates machine learning, an aspect of artificial intelligence (AI).

Figure 5:
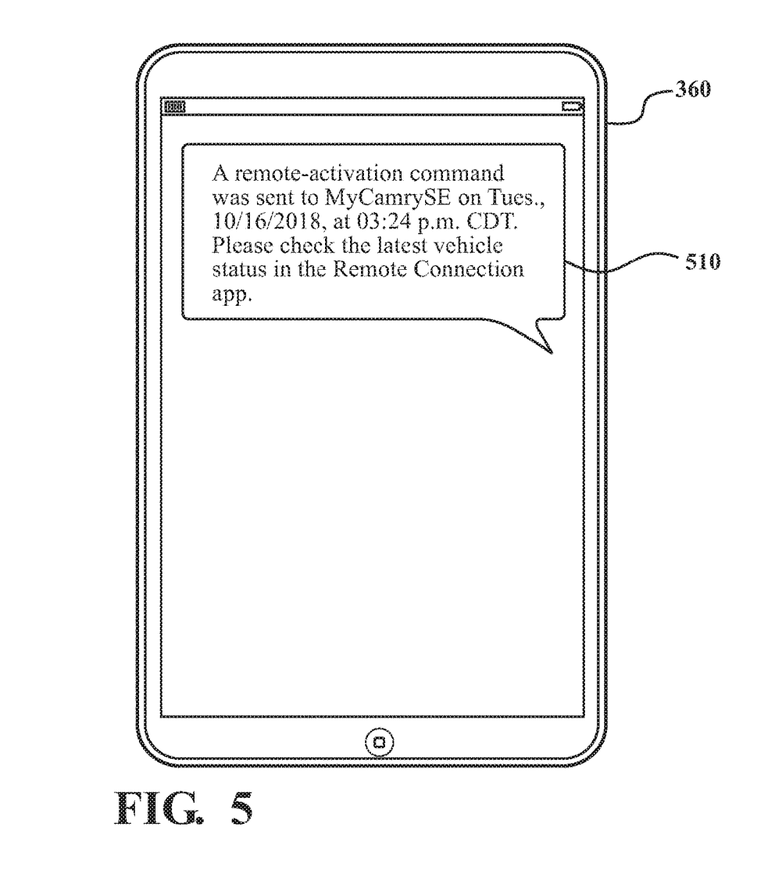
FIG. 5 illustrates an aspect of a user interface for a user mobile device, in accordance with an illustrative embodiment of the invention.

In some embodiments, remote-activation module 440 includes instructions to transmit, to user's mobile device 360 (e.g., a smartphone, tablet computer, personal digital assistant, etc.), a notification that a remote-activation command has been transmitted to the user's vehicle (vehicle 100). An example of such a notification is illustrated in FIG. 5. In FIG. 5, notification 510 informs a user that his or her vehicle received a remote-activation command at a certain date and time. In this particular embodiment, the user is invited to check an app on user's mobile device 360 for the latest status of vehicle 100 (e.g., whether the engine has been started, whether the HVAC system has been activated, etc.). For the purposes of this description, the mobile app is called the "Remote Connection" app.

Figure 6:
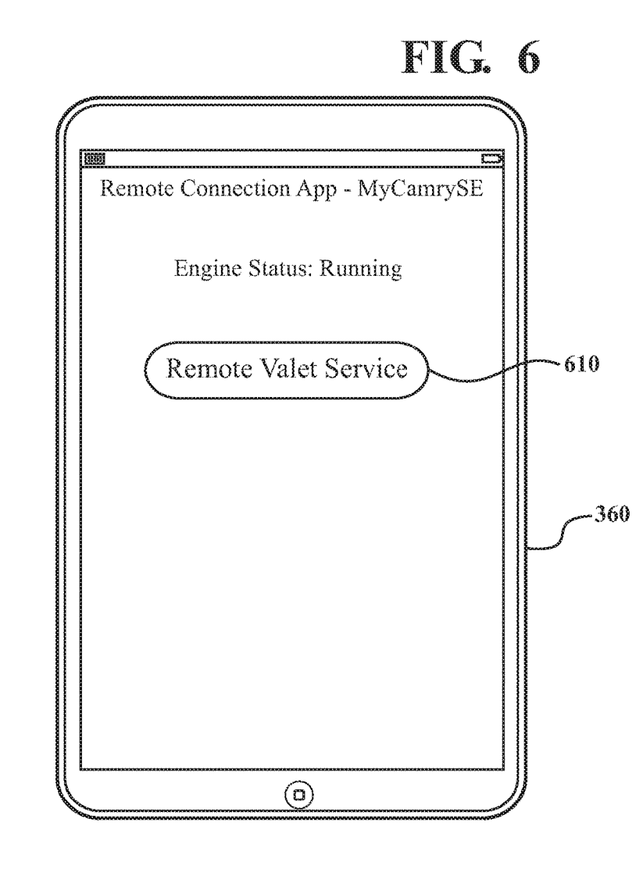
FIG. 6 illustrates another aspect of a user interface for a user mobile device, in accordance with an illustrative embodiment of the invention.

FIG. 6 illustrates an example of another aspect of a user interface for user's mobile device 360. In the embodiment shown in FIG. 6, the user is informed that the engine has been started and is currently running. In this embodiment, the user is also presented with remote-valet activation element 610. Executing (e.g., touching or tapping on) remote-valet activation element 610 causes a message to be sent to remote-features server 330 that, in turn, causes remote-activation module 440 to transmit, to vehicle 100, a remote-valet command that summons vehicle 100 to a user pickup location. In a different embodiment, activating remote-valet activation element 610 causes a remote-valet command to be sent directly from user's mobile device 360 to vehicle 100, bypassing remote-features server 330. The user pickup location can be, for example, the user's current location, as determined from the GPS coordinates of user's mobile device 360, or another location in the vicinity that the user specifies (e.g., a curb along a particular street).

In other embodiments, remote-activation module 440, in accordance with user preferences 460, automatically transmits a remote-valet command to vehicle 100 in addition to or in combination with transmitting a remote-activation command. That is, remote-activation module 440 transmits separate remote-activation and remote-valet commands, or, depending on the particular embodiment, it transmits a single combined remote command to vehicle 100 that both causes remote activation (e.g., starting the vehicle's engine) and autonomous driving to the user pickup location (remote valet service). The embodiments in which remote-activation module 440 automatically transmits a remote-valet command to vehicle 100, whether separate from the remote-activation command or combined with it, frees the user from having to request remote-valet service manually via user's mobile device 360, as illustrated in FIG. 6. In the embodiments including the remote-valet feature, vehicle 100 is, of course, an autonomous vehicle capable of driving from its parked location to the user pickup location without human intervention, as discussed further below.

Figure 1:
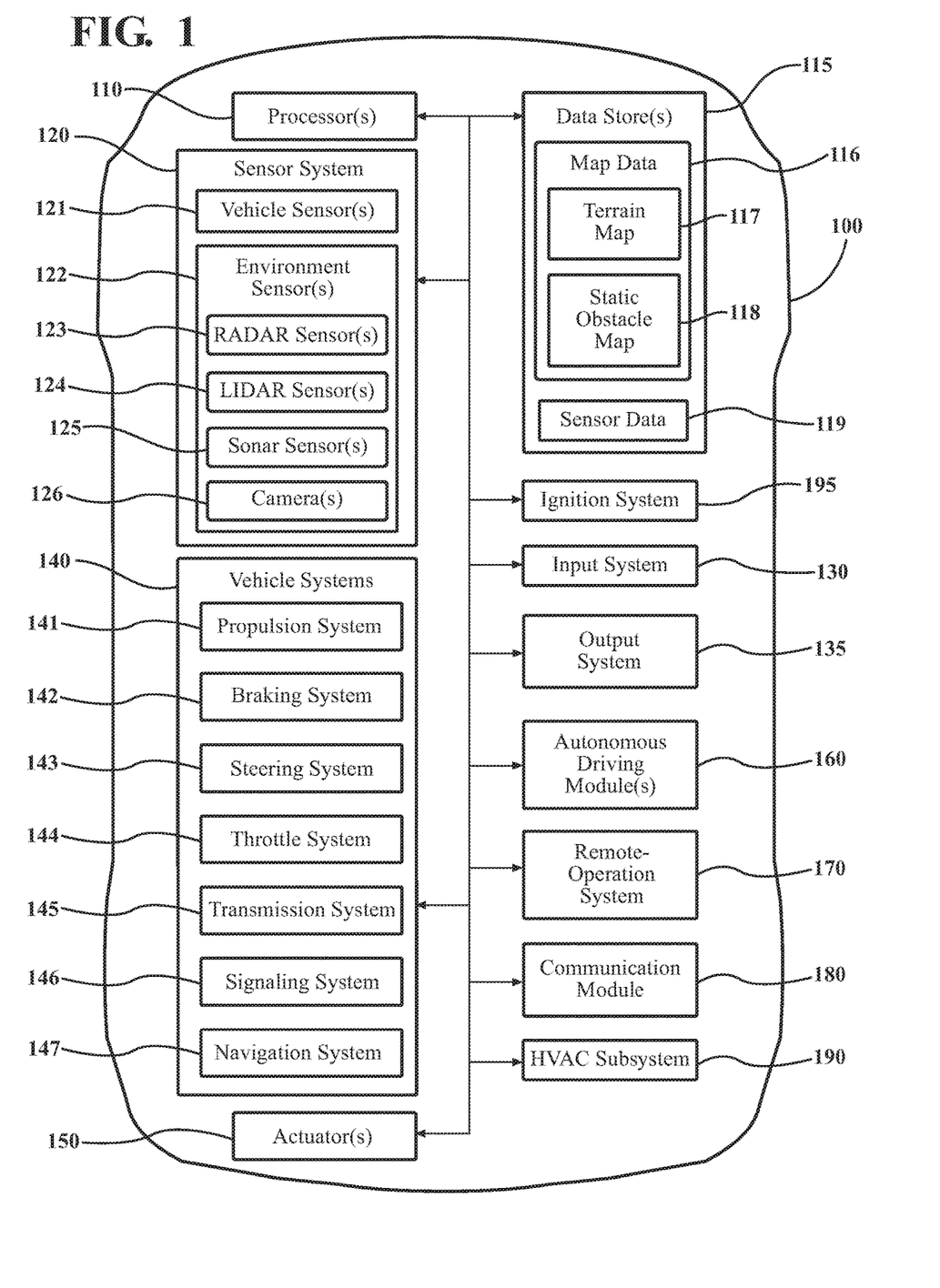
FIG. 1 illustrates one embodiment of a vehicle within which systems and methods disclosed herein may be implemented.

Referring to FIG. 1, an example of a vehicle 100 is illustrated. As used herein, a "vehicle" is any form of motorized transport. In one or more implementations, the vehicle 100 is an automobile. While arrangements will be described herein with respect to automobiles, it will be understood that embodiments are not limited to automobiles. In some implementations, the vehicle 100 may be any other form of motorized transport.

The vehicle 100 also includes various elements. It will be understood that in various embodiments it may not be necessary for the vehicle 100 to have all of the elements shown in FIG. 1. The vehicle 100 can have any combination of the various elements shown in FIG. 1. Further, the vehicle 100 can have additional elements to those shown in FIG. 1 (e.g., an engine). In some arrangements, the vehicle 100 may be implemented without one or more of the elements shown in FIG. 1. While the various elements are shown as being located within the vehicle 100 in FIG. 1, it will be understood that one or more of these elements can be located external to the vehicle 100, either wholly or in part. Further, the elements shown may be physically separated by large distances.

Some of the possible elements of the vehicle 100 are shown in FIG. 1 and will be described along with subsequent figures. However, a description of many of the elements in FIG. 1 will be provided after the discussion of FIGS. 2-9 for purposes of brevity of this description. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those of skill in the art, however, will understand that the embodiments described herein may be practiced using various combinations of these elements.

Vehicle 100 includes a remote-operation system 170, which is implemented to perform methods and other functions as disclosed herein relating to the remote activation of vehicle 100. Vehicle 100 also includes communication module 180, a transceiver that enables vehicle 100 to communicate with a variety of devices via one or more networks such as network 320 via wireless communication link 310 (e.g., 3G, 4G LTE, 5G, etc.). Vehicle 100 also includes heating, ventilation, and air-conditioning (HVAC) subsystem 190 and ignition system 195. Ignition system 195 is used to start an internal combustion engine in embodiments in which vehicle 100 includes such an engine. As discussed above, in other embodiments, vehicle 100 is an electric vehicle or a hybrid vehicle.

Figure 2:
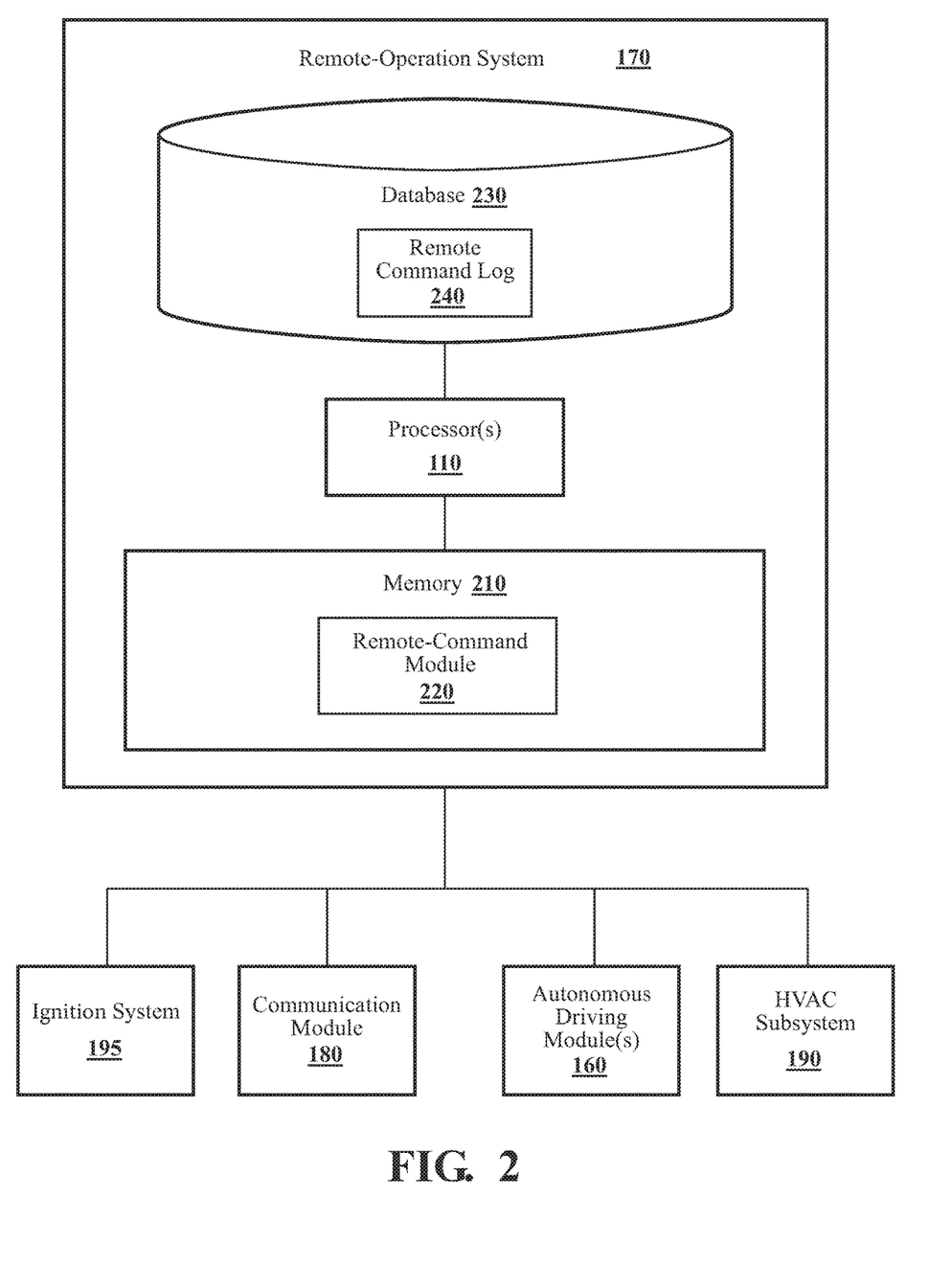
FIG. 2 illustrates one embodiment of a remote-operation system.

With reference to FIG. 2, one embodiment of the remote-operation system 170 of FIG. 1 is further illustrated. The remote-operation system 170 is shown as including one or more processors 110 from the vehicle 100 of FIG. 1. Accordingly, the one or more processors 110 may be a part of the remote-operation system 170, the remote-operation system 170 may include a separate processor from the one or more processors 110 of the vehicle 100, or the remote-operation system 170 may access the one or more processors 110 through a data bus or another communication path. In one embodiment, the remote-operation system 170 includes a memory 210 that stores a remote-command module 220. The memory 210 is a random-access memory (RAM), read-only memory (ROM), a hard-disk drive, a flash memory, or other suitable memory for storing remote-command module 220. Remote-command module 220 includes, for example, computer-readable instructions that when executed by the one or more processors 110, cause the one or more processors 110 to perform the various functions disclosed herein. Database 230 optionally stores remote command log 240, a log of remote-activation commands received and, in some embodiments, remote-valet commands received by vehicle 100.

As indicated in FIG. 2, remote-operation system 170 communicates with ignition system 195, HVAC subsystem 190, and autonomous driving module(s) 160. As discussed above, remote-operation system 170 can communicate with devices such as remote-features server 330 and user's mobile device 360 via communication module 180 and network 320.

Remote-command module 220 generally includes instructions that cause one or more processors 110 to receive and process commands transmitted from remote locations (e.g., the location of remote-features server 330 or user's mobile device 360) to activate one or more subsystems of vehicle 100. As discussed above, those subsystems can include, without limitation, an engine (not shown in FIG. 1) and HVAC subsystem 190. More specifically, remote-command module 220 includes instructions to receive, at vehicle 100, a remote-activation command from remote-features server 330 prompted by an electronic payment transacted by a person associated with vehicle 100 (e.g., the vehicle's owner or an authorized driver or passenger), as discussed above. In response to receipt of the remote-activation command, remote-command module 220 activates the specified subsystem(s).

As discussed above, if vehicle 100 is an internal-combustion-engine vehicle, activation could involve starting the engine. In such an embodiment, the remote-activation command may also activate and regulate HVAC subsystem 190 to bring the passenger compartment of vehicle 100 to a desired comfortable temperature before a user reenters the vehicle. As also mentioned above, operating the HVAC system of an internal-combustion-engine vehicle usually requires that the engine be running. In an embodiment in which vehicle 100 is an electric vehicle, the remote-activation command can simply activate HVAC subsystem 190.

In some embodiments, remote-command module 220 includes instructions to receive, at the vehicle, a remote-valet command from remote-features server 330 or user's mobile device 360, as discussed above. In response to the remote-valet command, remote-command module 220 instructs or directs autonomous driving module(s) 160 to drive vehicle 100 autonomously from its current location to a user pickup location, as discussed above. More details regarding autonomous driving module(s) 160 and autonomous driving modes are provided below in connection with the discussion of other aspects of FIG. 1.

Figure 7:
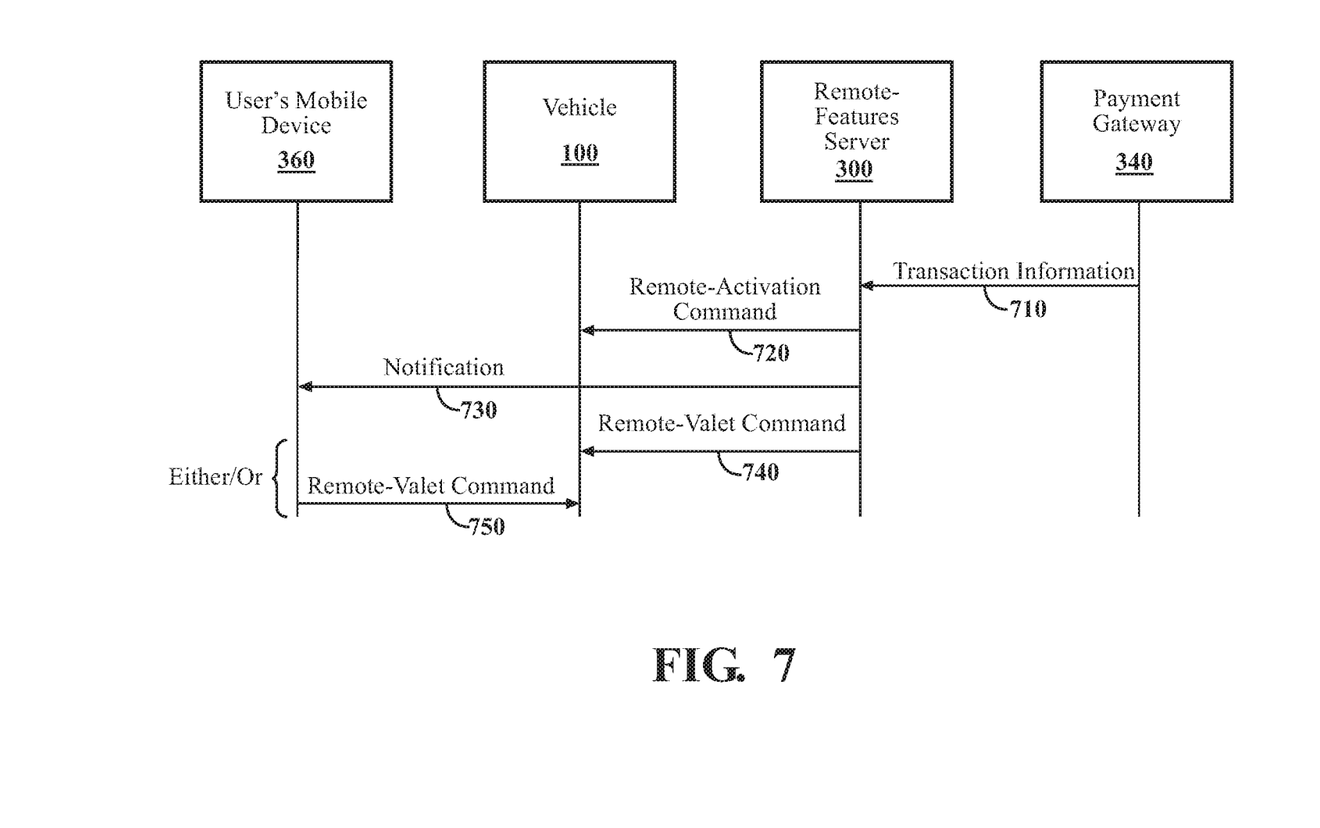
FIG. 7 illustrates the messaging that occurs among network nodes shown in FIG. 3, in accordance with an illustrative embodiment of the invention.

FIG. 7 illustrates the messaging that occurs among the network nodes shown in FIG. 3, in accordance with an illustrative embodiment of the invention. As shown in FIG. 7, once a user who has opted into the kind of remote-operation services described herein has completed an electronic payment via credit card or some other form of electronic payment, payment gateway 340 securely transmits transaction information 710 to remote-features server 330. Remote-features server 330, upon receipt of transaction information 710, associates that information with a particular vehicle 100. If remote-features server 330 determines that vehicle 100 is within a predetermined distance from the business at which the electronic payment was transacted, remote-features server 330 transmits a remote-activation command 720 to vehicle 100 to remotely activate one or more subsystems of vehicle 100. As discussed above, remote-command module 220 in vehicle 100 receives and acts on the remote-activation command 720. Optionally, in some embodiments, remote-features server 330 transmits a notification 730 to user's mobile device 360 informing the user that the remote-activation command 720 has been sent to vehicle 100.

In some embodiments, a remote-valet command 740 or 750 is transmitted to vehicle 100. As indicated in FIG. 7, the remote-valet command can be sent by remote-features server 330 or user's mobile device 360, depending on the embodiment. In embodiments in which remote-features server 330 automatically sends remote-valet command 740 in accordance with user preferences 460, the remote-valet command 740 can be a separate transmitted message from remote-activation command 720, or it may be part of a single combined message. In other embodiments, remote-valet command 740 is sent by remote-features server 330 in response to a request from user's mobile device 360, like the example discussed above in connection with FIG. 6. As explained above, in some embodiments, the remote-valet command 740 is sent directly from user's mobile device 360 to vehicle 100 via network 320 without remote-features server 330 being involved.

Figure 8:
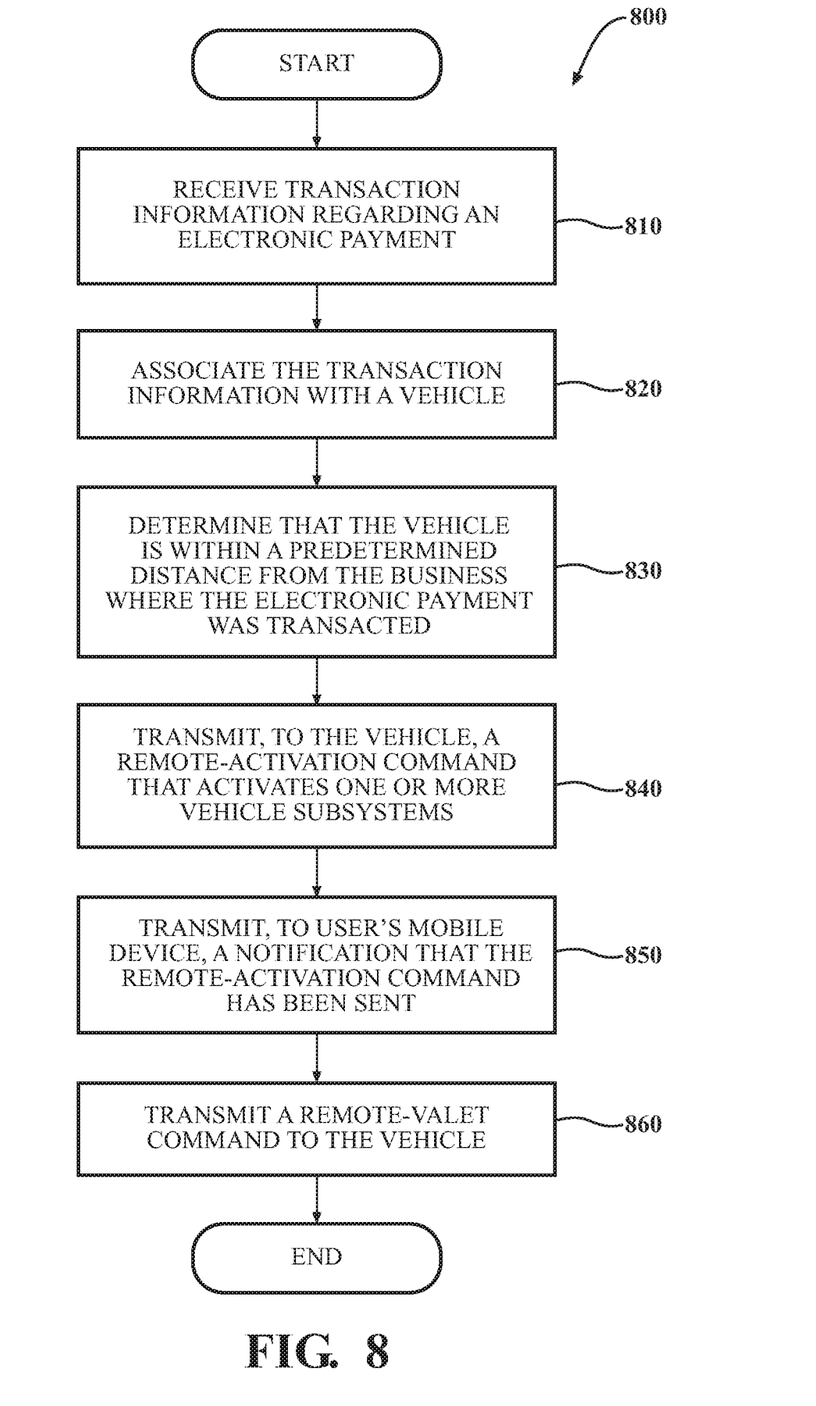
FIG. 8 is a flowchart of a method of remotely activating a vehicle, in accordance with an illustrative embodiment of the invention.

FIG. 8 is a flowchart of a method 800 of remotely activating a vehicle, in accordance with an illustrative embodiment of the invention. Method 800 will be discussed from the perspective of remote-features server 330 (refer to FIGS. 3 and 4). While method 800 is discussed in combination with remote-features server 330, it should be appreciated that method 800 is not limited to being implemented within remote-features server 330, but remote-features server 330 is instead one example of a system that may implement method 800.

At block 810, payment-information module 430 of remote-features server 330 receives transaction information 710 regarding an electronic payment. As discussed above, such transaction information can include the date and time of the transaction, the business or entity to which the payment was made, the transaction amount, and identification of the instrument used for payment (e.g., a credit card number or account number). At block 820, payment-information module 430 associates the transaction information with a specific vehicle 100 (e.g., based on the credit card number or account number of the opted-in user).

At block 830, remote-activation module 440 determines that the particular vehicle 100 is within a predetermined distance from the business where the associated user transacted the electronic payment. As discussed above, the predetermined distance can be configured by the user, in some embodiments. At block 840, remote-activation module 440 transmits, to vehicle 100, a remote-activation command 720 that causes one or more subsystems of vehicle 100 to be activated remotely, as discussed above. As discussed above, those subsystems can include, without limitation, the vehicle's engine, HVAC subsystem 190, or both, depending on the type of vehicle.

Optionally, at block 850, in some embodiments, remote-activation module 440 transmits, to user's mobile device 360, a notification 730 that remote-activation command 720 has been sent to vehicle 100. An example of such a notification is shown in FIG. 5.

Also optionally, at block 860, in some embodiments, remote-activation module 440 transmits a remote-valet command 750 to vehicle 100 that, upon being processed by remote-command module 220 of vehicle 100, causes vehicle 100 to drive autonomously to a user pickup location (e.g., the user's current location, based on GPS information obtained from user's mobile device 360, or another location in the vicinity specified by the user), as described above. An example of a user interface permitting a user to send a remote-valet command 740 to vehicle 100 is shown in FIG. 6.

Figure 9:
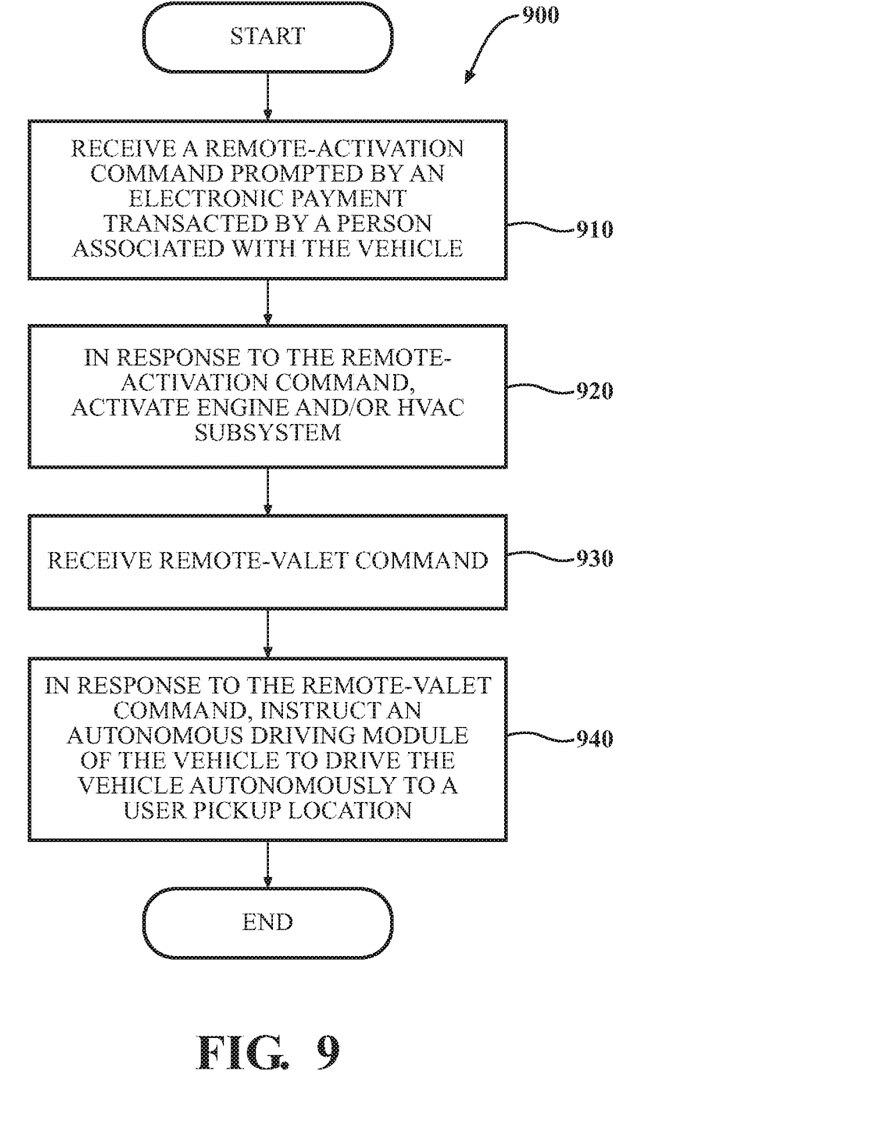
FIG. 9 is a flowchart of a method of remotely activating a vehicle, in accordance with another illustrative embodiment of the invention.

FIG. 9 is a flowchart of a method 900 of remotely activating a vehicle, in accordance with another illustrative embodiment of the invention. Method 900 will be discussed from the perspective of remote-operation system 170 of vehicle 100 (refer to FIGS. 1 and 2). While method 900 is discussed in combination with remote-operation system 170, it should be appreciated that method 900 is not limited to being implemented within remote-operation system 170, but remote-operation system 170 is instead one example of a system that may implement method 900.

At block 910, remote-command module 220 receives, at a vehicle 100, a remote-activation command 720 prompted by an electronic payment transacted by a person (owner, driver, user, or passenger) associated with the vehicle 100. At block 920, in response to the remote-activation command 720, remote-command module 220 activates one or more subsystems of vehicle 100. More specifically, in some embodiments, remote-command module 220 activates (starts) the vehicle's engine via ignition system 195 (if it is an internal-combustion-engine vehicle), HVAC subsystem 190, or both, as discussed above.

At block 930, in some embodiments, remote-command module 220 receives a remote-valet command 740. At block 940, remote-command module 220, in response to the remote-valet command 740, instructs autonomous driving module(s) 160 to drive the vehicle 100 to a user pickup location, as discussed above.

FIG. 1 will now be discussed in full detail as an example vehicle environment within which the system and methods disclosed herein may operate. In some instances, the vehicle 100 is configured to switch selectively between an autonomous mode, one or more semi-autonomous operational modes, and/or a manual mode. Such switching also referred to as handover when transitioning to a manual mode can be implemented in a suitable manner, now known or later developed. "Manual mode" means that all of or a majority of the navigation and/or maneuvering of the vehicle is performed according to inputs received from a user (e.g., human driver/operator).

In one or more embodiments, the vehicle 100 is an autonomous vehicle. As used herein, "autonomous vehicle" refers to a vehicle that operates in an autonomous mode. "Autonomous mode" refers to navigating and/or maneuvering the vehicle 100 along a travel route using one or more computing systems to control the vehicle 100 with minimal or no input from a human driver/operator. In one or more embodiments, the vehicle 100 is highly automated or completely automated. In one embodiment, the vehicle 100 is configured with one or more semi-autonomous operational modes in which one or more computing systems perform a portion of the navigation and/or maneuvering of the vehicle along a travel route, and a vehicle operator (i.e., driver) provides inputs to the vehicle to perform a portion of the navigation and/or maneuvering of the vehicle 100 along a travel route. Thus, in one or more embodiments, the vehicle 100 operates autonomously according to a particular defined level of autonomy. For example, the vehicle 100 can operate according to the Society of Automotive Engineers (SAE) automated vehicle classifications 0-5. In one embodiment, the vehicle 100 operates according to SAE level 2, which provides for the autonomous driving module 160 controlling the vehicle 100 by braking, accelerating, and steering without operator input but the driver/operator is to monitor the driving and be vigilant and ready to intervene with controlling the vehicle 100 if the autonomous module 160 fails to properly respond or is otherwise unable to adequately control the vehicle 100.

The vehicle 100 can include one or more processors 110. In one or more arrangements, the processor(s) 110 can be a main processor of the vehicle 100. For instance, the processor(s) 110 can be an electronic control unit (ECU). The vehicle 100 can include one or more data stores 115 for storing one or more types of data. The data store 115 can include volatile and/or non-volatile memory. Examples of suitable data stores 115 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof.

The data store 115 can be a component of the processor(s) 110, or the data store 115 can be operably connected to the processor(s) 110 for use thereby. The term "operably connected," as used throughout this description, can include direct or indirect connections, including connections without direct physical contact.

In one or more arrangements, the one or more data stores 115 can include map data 116. The map data 116 can include maps of one or more geographic areas. In some instances, the map data 116 can include information or data on roads, traffic control devices, road markings, structures, features, and/or landmarks in the one or more geographic areas. The map data 116 can be in any suitable form. In some instances, the map data 116 can include aerial views of an area. In some instances, the map data 116 can include ground views of an area, including 360-degree ground views. The map data 116 can include measurements, dimensions, distances, and/or information for one or more items included in the map data 116 and/or relative to other items included in the map data 116. The map data 116 can include a digital map with information about road geometry. The map data 116 can be high quality and/or highly detailed.

In one or more arrangement, the map data 116 can include one or more terrain maps 117. The terrain map(s) 117 can include information about the ground, terrain, roads, surfaces, and/or other features of one or more geographic areas. The terrain map(s) 117 can include elevation data in the one or more geographic areas. The map data 116 can be high quality and/or highly detailed. The terrain map(s) 117 can define one or more ground surfaces, which can include paved roads, unpaved roads, land, and other things that define a ground surface.

In one or more arrangement, the map data 116 can include one or more static obstacle maps 118. The static obstacle map(s) 118 can include information about one or more static obstacles located within one or more geographic areas. A "static obstacle" is a physical object whose position does not change or substantially change over a period of time and/or whose size does not change or substantially change over a period of time. Examples of static obstacles include trees, buildings, curbs, fences, railings, medians, utility poles, statues, monuments, signs, benches, furniture, mailboxes, large rocks, hills. The static obstacles can be objects that extend above ground level. The one or more static obstacles included in the static obstacle map(s) 118 can have location data, size data, dimension data, material data, and/or other data associated with it. The static obstacle map(s) 118 can include measurements, dimensions, distances, and/or information for one or more static obstacles. The static obstacle map(s) 118 can be high quality and/or highly detailed. The static obstacle map(s) 118 can be updated to reflect changes within a mapped area.

The one or more data stores 115 can include sensor data 119. In this context, "sensor data" means any information about the sensors that the vehicle 100 is equipped with, including the capabilities and other information about such sensors. As will be explained below, the vehicle 100 can include the sensor system 120. The sensor data 119 can relate to one or more sensors of the sensor system 120. As an example, in one or more arrangements, the sensor data 119 can include information on one or more LIDAR sensors 124 of the sensor system 120.

In some instances, at least a portion of the map data 116 and/or the sensor data 119 can be located in one or more data stores 115 located onboard the vehicle 100. Alternatively, or in addition, at least a portion of the map data 116 and/or the sensor data 119 can be located in one or more data stores 115 that are located remotely from the vehicle 100.

As noted above, the vehicle 100 can include the sensor system 120. The sensor system 120 can include one or more sensors. "Sensor" means any device, component and/or system that can detect, and/or sense something. The one or more sensors can be configured to detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors can function independently from each other. Alternatively, two or more of the sensors can work in combination with each other. In such a case, the two or more sensors can form a sensor network. The sensor system 120 and/or the one or more sensors can be operably connected to the processor(s) 110, the data store(s) 115, and/or another element of the vehicle 100 (including any of the elements shown in FIG. 1). The sensor system 120 can acquire data of at least a portion of the external environment of the vehicle 100 (e.g., nearby vehicles).

The sensor system 120 can include any suitable type of sensor. Various examples of different types of sensors will be described herein. However, it will be understood that the embodiments are not limited to the particular sensors described. The sensor system 120 can include one or more vehicle sensors 121. The vehicle sensor(s) 121 can detect, determine, and/or sense information about the vehicle 100 itself. In one or more arrangements, the vehicle sensor(s) 121 can be configured to detect, and/or sense position and orientation changes of the vehicle 100, such as, for example, based on inertial acceleration. In one or more arrangements, the vehicle sensor(s) 121 can include one or more accelerometers, one or more gyroscopes, an inertial measurement unit (IMU), a dead-reckoning system, a global navigation satellite system (GNSS), a global positioning system (GPS), a navigation system 147, and/or other suitable sensors. The vehicle sensor(s) 121 can be configured to detect, and/or sense one or more characteristics of the vehicle 100. In one or more arrangements, the vehicle sensor(s) 121 can include a speedometer to determine a current speed of the vehicle 100.

Alternatively, or in addition, the sensor system 120 can include one or more environment sensors 122 configured to acquire, and/or sense driving environment data. "Driving environment data" includes and data or information about the external environment in which an autonomous vehicle is located or one or more portions thereof. For example, the one or more environment sensors 122 can be configured to detect, quantify and/or sense obstacles in at least a portion of the external environment of the vehicle 100 and/or information/data about such obstacles. Such obstacles may be stationary objects and/or dynamic objects. The one or more environment sensors 122 can be configured to detect, measure, quantify and/or sense other things in the external environment of the vehicle 100, such as, for example, lane markers, signs, traffic lights, traffic signs, lane lines, crosswalks, curbs proximate the vehicle 100, off-road objects, etc.

Various examples of sensors of the sensor system 120 will be described herein. The example sensors may be part of the one or more environment sensors 122 and/or the one or more vehicle sensors 121. Moreover, the sensor system 120 can include operator sensors that function to track or otherwise monitor aspects related to the driver/operator of the vehicle 100. However, it will be understood that the embodiments are not limited to the particular sensors described.

As an example, in one or more arrangements, the sensor system 120 can include one or more radar sensors 123, one or more LIDAR sensors 124, one or more sonar sensors 125, and/or one or more cameras 126. In one or more arrangements, the one or more cameras 126 can be high dynamic range (HDR) cameras, infrared (IR) cameras and so on. In one embodiment, the cameras 126 include one or more cameras disposed within a passenger compartment of the vehicle for performing eye-tracking on the operator/driver in order to determine a gaze of the operator/driver, an eye track of the operator/driver, and so on.

The vehicle 100 can include an input system 130. An "input system" includes any device, component, system, element or arrangement or groups thereof that enable information/data to be entered into a machine. The input system 130 can receive an input from a vehicle passenger (e.g. a driver or a passenger). The vehicle 100 can include an output system 135. An "output system" includes any device, component, or arrangement or groups thereof that enable information/data to be presented to a vehicle passenger (e.g. a person, a vehicle passenger, etc.).

The vehicle 100 can include one or more vehicle systems 140. Various examples of the one or more vehicle systems 140 are shown in FIG. 1. However, the vehicle 100 can include more, fewer, or different vehicle systems. It should be appreciated that although particular vehicle systems are separately defined, each or any of the systems or portions thereof may be otherwise combined or segregated via hardware and/or software within the vehicle 100. The vehicle 100 can include a propulsion system 141, a braking system 142, a steering system 143, throttle system 144, a transmission system 145, a signaling system 146, and/or a navigation system 147. Each of these systems can include one or more devices, components, and/or combination thereof, now known or later developed.

The navigation system 147 can include one or more devices, sensors, applications, and/or combinations thereof, now known or later developed, configured to determine the geographic location of the vehicle 100 and/or to determine a travel route for the vehicle 100. The navigation system 147 can include one or more mapping applications to determine a travel route for the vehicle 100. The navigation system 147 can include a global positioning system, a local positioning system or a geolocation system.

The processor(s) 110, the remote-operation system 170, and/or the autonomous driving module(s) 160 can be operably connected to communicate with the various vehicle systems 140 and/or individual components thereof. For example, returning to FIG. 1, the processor(s) 110 and/or the autonomous driving module(s) 160 can be in communication to send and/or receive information from the various vehicle systems 140 to control the movement, speed, maneuvering, heading, direction, etc. of the vehicle 100. The processor(s) 110, the remote-operation system 170, and/or the autonomous driving module(s) 160 may control some or all of these vehicle systems 140 and, thus, may be partially or fully autonomous.

The processor(s) 110, the remote-operation system 170, and/or the autonomous driving module(s) 160 can be operably connected to communicate with the various vehicle systems 140 and/or individual components thereof. For example, returning to FIG. 1, the processor(s) 110, the remote-operation system 170, and/or the autonomous driving module(s) 160 can be in communication to send and/or receive information from the various vehicle systems 140 to control the movement, speed, maneuvering, heading, direction, etc. of the vehicle 100. The processor(s) 110, the remote-operation system 170, and/or the autonomous driving module(s) 160 may control some or all of these vehicle systems 140.

The processor(s) 110, the remote-operation system 170, and/or the autonomous driving module(s) 160 may be operable to control the navigation and/or maneuvering of the vehicle 100 by controlling one or more of the vehicle systems 140 and/or components thereof. For instance, when operating in an autonomous mode, the processor(s) 110, the remote-operation system 170, and/or the autonomous driving module(s) 160 can control the direction and/or speed of the vehicle 100. The processor(s) 110, the remote-operation system 170, and/or the autonomous driving module(s) 160 can cause the vehicle 100 to accelerate (e.g., by increasing the supply of fuel provided to the engine), decelerate (e.g., by decreasing the supply of fuel to the engine and/or by applying brakes) and/or change direction (e.g., by turning the front two wheels). As used herein, "cause" or "causing" means to make, force, compel, direct, command, instruct, and/or enable an event or action to occur or at least be in a state where such event or action may occur, either in a direct or indirect manner.

The vehicle 100 can include one or more actuators 150. The actuators 150 can be any element or combination of elements operable to modify, adjust and/or alter one or more of the vehicle systems 140 or components thereof to responsive to receiving signals or other inputs from the processor(s) 110 and/or the autonomous driving module(s) 160. Any suitable actuator can be used. For instance, the one or more actuators 150 can include motors, pneumatic actuators, hydraulic pistons, relays, solenoids, and/or piezoelectric actuators, just to name a few possibilities.

The vehicle 100 can include one or more modules, at least some of which are described herein. The modules can be implemented as computer-readable program code that, when executed by a processor 110, implement one or more of the various processes described herein. One or more of the modules can be a component of the processor(s) 110, or one or more of the modules can be executed on and/or distributed among other processing systems to which the processor(s) 110 is operably connected. The modules can include instructions (e.g., program logic) executable by one or more processor(s) 110. Alternatively, or in addition, one or more data store 115 may contain such instructions.

In one or more arrangements, one or more of the modules described herein can include artificial or computational intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

The vehicle 100 can include one or more autonomous driving modules 160. The autonomous driving module(s) 160 can be configured to receive data from the sensor system 120 and/or any other type of system capable of capturing information relating to the vehicle 100 and/or the external environment of the vehicle 100. In one or more arrangements, the autonomous driving module(s) 160 can use such data to generate one or more driving scene models. The autonomous driving module(s) 160 can determine position and velocity of the vehicle 100. The autonomous driving module(s) 160 can determine the location of obstacles, or other environmental features including traffic signs, trees, shrubs, neighboring vehicles, pedestrians, etc.

The autonomous driving module(s) 160 can be configured to receive, and/or determine location information for obstacles within the external environment of the vehicle 100 for use by the processor(s) 110, and/or one or more of the modules described herein to estimate position and orientation of the vehicle 100, vehicle position in global coordinates based on signals from a plurality of satellites, or any other data and/or signals that could be used to determine the current state of the vehicle 100 or determine the position of the vehicle 100 with respect to its environment for use in either creating a map or determining the position of the vehicle 100 in respect to map data.

The autonomous driving module(s) 160 either independently or in combination with the remote-operation system 170 can be configured to determine travel path(s), current autonomous driving maneuvers for the vehicle 100, future autonomous driving maneuvers and/or modifications to current autonomous driving maneuvers based on data acquired by the sensor system 120, driving scene models, and/or data from any other suitable source. "Driving maneuver" means one or more actions that affect the movement of a vehicle. Examples of driving maneuvers include: accelerating, decelerating, braking, turning, moving in a lateral direction of the vehicle 100, changing travel lanes, merging into a travel lane, and/or reversing, just to name a few possibilities. The autonomous driving module(s) 160 can be configured can be configured to implement determined driving maneuvers. The autonomous driving module(s) 160 can cause, directly or indirectly, such autonomous driving maneuvers to be implemented. As used herein, "cause" or "causing" means to make, command, instruct, and/or enable an event or action to occur or at least be in a state where such event or action may occur, either in a direct or indirect manner. The autonomous driving module(s) 160 can be configured to execute various vehicle functions and/or to transmit data to, receive data from, interact with, and/or control the vehicle 100 or one or more systems thereof (e.g. one or more of vehicle systems 140).

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-9, but the embodiments are not limited to the illustrated structure or application.

The flowcharts and block diagrams in the figures illustrate the architecture, functionality, and operation of possible implementations of systems, methods and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain or store a program for use by or in connection with an instruction execution system, apparatus, or device.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™ Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g. AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A system for remotely activating a vehicle, the system comprising:
   one or more processors;
   a memory communicably coupled to the one or more processors and storing:
   a payment-information module including instructions that when executed by the one or more processors cause the one or more processors to:
     receive transaction information regarding an electronic payment made by a user who used the vehicle to visit a business where the electronic payment was transacted; and
     associate the transaction information with the vehicle; and
   a remote-activation module including instructions that when executed by the one or more processors cause the one or more processors to:
     determine that the vehicle is within a predetermined distance from the business where the electronic payment was transacted, wherein the predetermined distance is configured by the user as a preference; and
     transmit, to the vehicle, a remote-activation command that activates one or more subsystems of the vehicle.

2. The system of claim 1, wherein the one or more subsystems of the vehicle include an engine of the vehicle.

3. The system of claim 1, wherein the one or more subsystems of the vehicle include a heating, ventilation, and air-conditioning (HVAC) subsystem of the vehicle.

4. The system of claim 1, wherein the remote-activation module includes instructions that cause transmission of the remote-activation command to be conditioned on one or more user preferences.

5. The system of claim 4, wherein the one or more user preferences include at least one of user location, vehicle location, weather, an identity of the business, time of day, and a user's calendar of scheduled activities.

6. The system of claim 4, wherein the remote-activation module includes instructions to infer, at least in part, the one or more user preferences based on analysis of the user's past choices.

7. The system of claim 1, wherein the remote-activation module includes further instructions to transmit, to a mobile device associated with a user, a notification that the remote-activation command has been transmitted to the vehicle.

8. The system of claim 1, wherein the remote-activation module includes further instructions to transmit, to the vehicle, a remote-valet command that causes the vehicle to drive autonomously to a user pickup location.

9. A method of remotely activating a vehicle, the method comprising:
   receiving transaction information regarding an electronic payment made by a user who used the vehicle to visit a business where the electronic payment was transacted;
   associating the transaction information with the vehicle;
   determining that the vehicle is within a predetermined distance from the business where the electronic payment was transacted, wherein the predetermined distance is configured by the user as a preference; and
   transmitting, to the vehicle, a remote-activation command that activates one or more subsystems of the vehicle.

10. The method of claim 9, wherein the one or more subsystems of the vehicle include an engine of the vehicle.

11. The method of claim 9, wherein the one or more subsystems of the vehicle include a heating, ventilation, and air-conditioning (HVAC) subsystem of the vehicle.

12. The method of claim 9, wherein transmitting, to the vehicle, the remote-activation command is conditioned on one or more user preferences.

13. The method of claim 12, wherein the one or more user preferences include at least one of user location, vehicle location, weather, an identity of the business, time of day, and a user's calendar of scheduled activities.

14. The method of claim 12, wherein the one or more user preferences are inferred, at least in part, based on analysis of the user's past choices.

15. The method of claim 9, further comprising transmitting, to a mobile device associated with a user, a notification that the remote-activation command has been transmitted to the vehicle.

16. The method of claim 9, further comprising transmitting, to the vehicle, a remote-valet command that causes the vehicle to drive autonomously to a user pickup location.

17. A system for remotely activating a vehicle, the system comprising:
   one or more processors;
   a memory communicably coupled to the one or more processors and storing:
   a remote-command module including instructions that when executed by the one or more processors cause the one or more processors to:
     receive, at the vehicle, a remote-activation command prompted by an electronic payment transacted by a person who used the vehicle to visit a business where the electronic payment was transacted; and
     in response to the remote-activation command, activate at least one of an engine and a heating, ventilation, and air-conditioning (HVAC) subsystem of the vehicle.

18. The system of claim 17, wherein the remote-command module includes further instructions to:
   receive, at the vehicle, a remote-valet command; and
   in response to the remote-valet command, instruct an autonomous driving module of the vehicle to drive the vehicle autonomously to a user pickup location.

19. A method of remotely activating a vehicle, the method comprising:
   receiving, at the vehicle, a remote-activation command prompted by an electronic payment transacted by a person who used the vehicle to visit a business where the electronic payment was transacted; and
   in response to the remote-activation command, activating at least one of an engine and a heating, ventilation, and air-conditioning (HVAC) subsystem of the vehicle.

20. The method of claim 19, further comprising:
receiving, at the vehicle, a remote-valet command; and
in response to the remote-valet command, instructing an autonomous driving module of the vehicle to drive the vehicle autonomously to a user pickup location.

\* \* \* \* \*